United States Patent
Lee et al.

(10) Patent No.: US 10,235,313 B2
(45) Date of Patent: Mar. 19, 2019

(54) CONNECTING CIRCUITRY AND COMPUTING SYSTEM HAVING THE SAME

(71) Applicant: Wistron Corporation, New Taipei (TW)

(72) Inventors: Syu-Siang Lee, New Taipei (TW); Ming-Chun Lee, New Taipei (TW); Zh-Wei Zhang, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 14/948,400

(22) Filed: Nov. 23, 2015

(65) Prior Publication Data

US 2017/0003709 A1 Jan. 5, 2017

(30) Foreign Application Priority Data

Jul. 2, 2015 (TW) .............................. 104121476 A

(51) Int. Cl.
*G06F 13/40* (2006.01)
*G06F 13/00* (2006.01)

(52) U.S. Cl.
CPC .......... *G06F 13/4022* (2013.01); *G06F 13/00* (2013.01)

(58) Field of Classification Search
None
See application file for complete search history.

(56) References Cited

U.S. PATENT DOCUMENTS

| | | | | |
|---|---|---|---|---|
| 2005/0053060 A1* | 3/2005 | Pettey | ............... | H04L 29/12009 370/385 |
| 2007/0113044 A1* | 5/2007 | Day | .................. | G06F 12/1027 711/207 |
| 2008/0126602 A1* | 5/2008 | Biran | ..................... | G06F 13/28 710/22 |
| 2008/0320214 A1* | 12/2008 | Ma | ....................... | G06F 3/0613 711/103 |
| 2009/0153163 A1* | 6/2009 | Han | ...................... | H01L 23/538 324/763.01 |
| 2009/0157961 A1* | 6/2009 | Gregg | ................. | G06F 12/0893 711/118 |
| 2009/0216910 A1* | 8/2009 | Duchesneau | ......... | G06F 9/5072 709/250 |
| 2010/0073860 A1* | 3/2010 | Moriai | ................. | G06F 3/0626 361/679.32 |
| 2010/0241799 A1* | 9/2010 | Schuette | ............... | G06F 3/0626 711/104 |

(Continued)

*Primary Examiner* — Henry Tsai
*Assistant Examiner* — Christopher A Bartels
(74) *Attorney, Agent, or Firm* — Winston Hsu

(57) ABSTRACT

A connecting circuitry is disclosed. The connecting circuitry is coupled to a storage device, a first motherboard and a second motherboard, and controlled by a first control signal and a second control signal to switch over to a first mode, to a second mode and to a third mode. The connecting circuitry includes a first exchanging unit; a second exchanging unit; and a first multiplexing unit, electrical connected to the first exchanging unit and the second exchanging unit; wherein the first mode is the storage device being only accessed by the first motherboard, the second mode is the storage device being only accessed by the second motherboard, and the third mode is the storage device being accessed by both the first motherboard and the second motherboard.

32 Claims, 7 Drawing Sheets

(56) References Cited

U.S. PATENT DOCUMENTS

| | | | |
|---|---|---|---|
| 2010/0281199 A1* | 11/2010 | Fu ......................... | G06F 13/409 |
| | | | 710/300 |
| 2011/0211310 A1* | 9/2011 | Farling ................... | G06F 1/185 |
| | | | 361/679.31 |
| 2016/0328347 A1* | 11/2016 | Worley ................. | G06F 13/385 |

* cited by examiner

CONNECTING CIRCUITRY AND COMPUTING SYSTEM HAVING THE SAME

BACKGROUND OF THE INVENTION

1. Field of the Invention

The present invention relates to a connecting circuitry and a computing system having the same, and more particularly, to a connecting circuitry and a computing system capable of switching between a storage device being accessed by a single motherboard only and being accessed by two motherboards simultaneously.

2. Description of the Prior Art

Compared to traditional hard drive, a solid state drive (SSD) has advantages of low power, low noise, anti-vibration, low heat dissipated, etc. Those advantages make the SSD store data more safely. The SSD gradually replaces the traditional hard drive in the fields of industry, military, aerospace, high class server, etc. A common SSD has single-port, and the single-port SSD is only coupled to a single motherboard. In the prior art, a dual-port SSD was developed. The dual-port SSD may be coupled to two motherboards. Notably, a number of data transmission channels provided by the SSD is fixed, regardless of the SSD being single-port or dual-port. In practice, a number of data transmission channels which the dual-port SSD provides for each motherboard is a half of a number of data transmission channels which the single-port SSD provides for the single motherboard, resulting that the dual-port SSD actually lowers a data transmission capacity to each motherboard. On the other hand, the prior art lacks a switching circuitry switching from two motherboards accessing the SSD simultaneously to single motherboard accessing the SSD only (or switching from single motherboard accessing the SSD only to two motherboards accessing the SSD simultaneously), which reduces a utilization flexibility of the SSD. Therefore, it is necessary to improve the prior art.

SUMMARY OF THE INVENTION

It is therefore a primary objective of the present invention to provide a connecting circuitry capable of switching between a storage device being accessed by a single motherboard only and being accessed by two motherboards simultaneously, and to provide a computing system using the connecting circuitry, so as to improve over disadvantages of the prior art.

An embodiment of the present invention discloses a connecting circuitry, coupled between a first interface and a second interface, the first interface coupled to a storage device, the second interface coupled to a first motherboard and a second motherboard, the connecting circuitry comprising a first exchanging unit, configured to receive and output a plurality of transmitting signal sets of the first motherboard and the second motherboard and determine an order of the plurality of transmitting signal sets delivered to a plurality of output pins of the first exchanging unit according to a first control signal; a second exchanging unit, configured to receive and output a plurality of receiving signal sets of the first motherboard and the second motherboard and determine an order of the plurality of receiving signal sets delivered to a plurality of output pins of the second exchanging unit according to the first control signal; and a first multiplexing unit, coupled to the first exchanging unit and the second exchanging unit, configured to receive a transmitting signal set and a receiving signal set of the first motherboard and a transmitting signal set and a receiving signal set of the second motherboard, and determine to output either the transmitting signal set and the receiving signal set of the first motherboard or the transmitting signal set and the receiving signal set of the second motherboard according to a second control signal.

An embodiment of the present invention further discloses A computing system, comprising a storage device; a first motherboard; a second motherboard; a connecting circuitry, coupled to the storage device via a first interface and coupled to the first motherboard and the second motherboard via a second interface, the connecting circuitry comprising a first exchanging unit, configured to receive and output a plurality of transmitting signal sets of the first motherboard and the second motherboard and determine an order of the plurality of transmitting signal sets delivered to a plurality of output pins of the first exchanging unit according to a first control signal; a second exchanging unit, configured to receive and output a plurality of receiving signal sets of the first motherboard and the second motherboard and determine an order of the plurality of receiving signal sets delivered to a plurality of output pins of the second exchanging unit according to the first control signal; and a first multiplexing unit, coupled to the first exchanging unit and the second exchanging unit, configured to receive a transmitting signal set and a receiving signal set of the first motherboard and a transmitting signal set and a receiving signal set of the second motherboard, and determine to output either the transmitting signal set and the receiving signal set of the first motherboard or the transmitting signal set and the receiving signal set of the second motherboard according to a second control signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
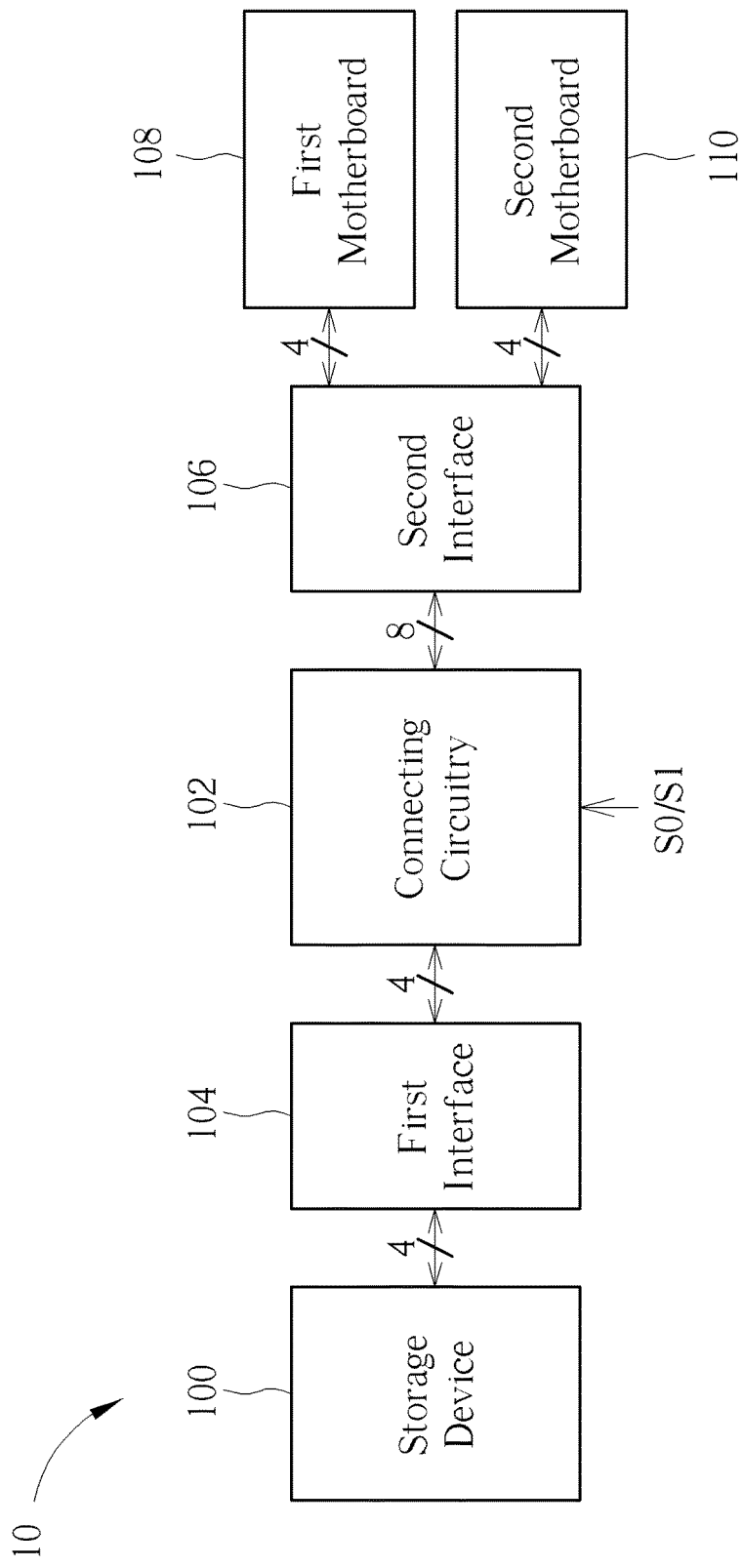
FIG. 1 is a schematic diagram of a computing system according to an embodiment of the present invention.

FIG. 1 is a schematic diagram of a computing system 10 according to an embodiment of the present invention. The computing system 10 may be a high class computing system such as a work station or a server. The computing system 10 comprises a storage device 100, a connecting circuitry 102, a first interface 104, a second interface 106, a first motherboard 108 and a second motherboard 110. The first motherboard 108 and the second motherboard 110 may be coupled to the storage device 100 via the second interface 106, the connecting circuitry 102 and the first interface 104, so as to access the storage device 100. In other words, the connecting circuitry 102 is coupled to the storage device 100 via the first interface 104, and coupled to the first motherboard 108 and the second motherboard 110 via the second interface 106. Moreover, the storage device 100 may be a dual-port solid state drive (SSD) or a single-port SSD. The first interface 104 may be an interface under a standard of SFF-8639, and the second interface 106 may be an interface under a standard of PCI-Express. The first interface 104 may provide 4 data transmission channels for the motherboards to access data. The second interface 106 may provide 8 data transmission channels, where 4 of the 8 data transmission channels are utilized by the first motherboard 108, and the rest 4 data transmission channels are utilized by the second motherboard 110.

Furthermore, the computing system 10 may switch operating modes of the storage device 100 being accessed by the first motherboard 108 and the second motherboard 110 according to a first control signal S0 and a second control signal S1. The operating modes may be the storage device 100 being accessed by the first motherboard 108 only, being accessed by the second motherboard 110 only, or being accessed by both the first motherboard 108 and the second motherboard 110 simultaneously. Moreover, the first control signal S0 may be a binary signal, as 0 or 1 corresponding to a first voltage or a second voltage, respectively. The first control signal S0 and the second control signal S1 may be generated by the first motherboard 108 or the second motherboard 110 and delivered to the connecting circuitry 102, so as to control the connecting circuitry 102 to switch over a first mode, a second mode and a third mode, where the first mode is the storage device 100 is accessed by the first motherboard 108 only, the second mode is the storage device 100 is accessed by the second motherboard 110 only, and the third mode is the storage device 100 is accessed by both the first motherboard 108 and the second motherboard 110 simultaneously.

Figure 2:
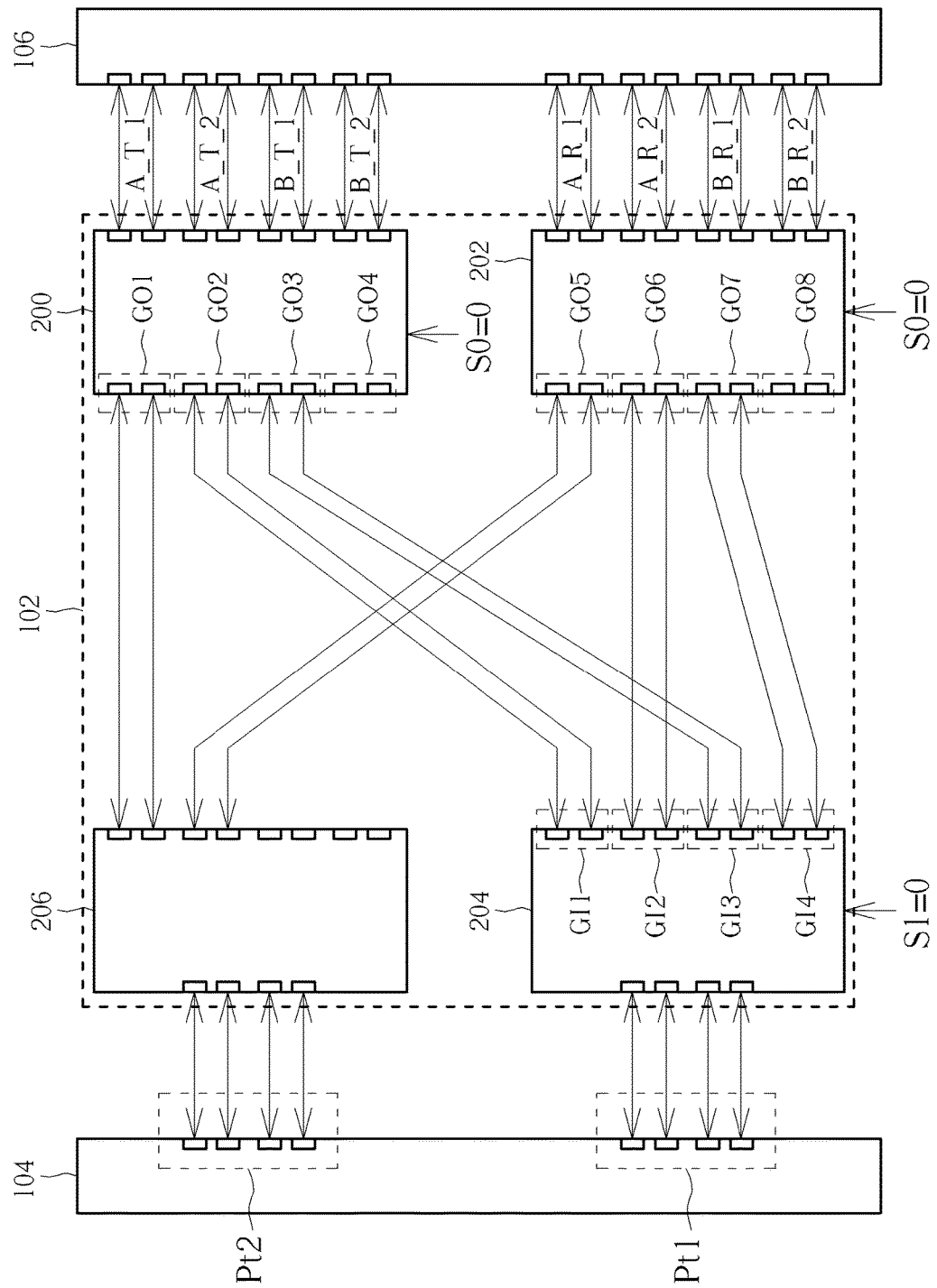
FIG. 2 is a schematic diagram of a connecting circuitry according to an embodiment of the present invention.

In detail, FIG. 2 is a schematic diagram of a connecting circuitry 102 according to an embodiment of the present invention. The connecting circuitry 102 comprises a first exchanging unit 200, a second exchanging unit 202, a first multiplexing unit 204 and a second multiplexing unit 206. The first exchanging unit 200, the second exchanging unit 202, the first multiplexing unit 204 and the second multiplexing unit 206 may be realized by integrated circuits (ICs). The first exchanging unit 200 is coupled to the first motherboard 108 and the second motherboard 110 via the second interface 106. The first exchanging unit 200 is configured to deliver a first transmitting signal set A_T_1 and a second transmitting signal set A_T_2 of the first motherboard 108 and a first transmitting signal set B_T_1 and a second transmitting signal set B_T_2 of the second motherboard 110. The first exchanging unit 200 comprises a first output pin set GO1, a second output pin set GO2, a third output pin set GO3 and a fourth output pin set GO4. The second exchanging unit 202 is coupled to the first motherboard 108 and the second motherboard 110 via the second interface 106. The second exchanging unit 202 is configured to deliver a first receiving signal set A_R_1 and a second receiving signal set A_R_2 of the first motherboard 108 and a first receiving signal set B_R_1 and a second receiving signal set B_R_2 of the second motherboard 110. The second exchanging unit 202 comprises a fifth output pin set GO5, a sixth output pin set GO6, a seventh output pin set GO7 and an eighth output pin set GO8.

In addition, the first multiplexing unit 204 is coupled to a first connecting port Pt1 of the first interface 104. The first multiplexing unit 204 comprises a first input pin set GI1, a second input pin set GI2, a third input pin set GI3 and a fourth input pin set GI4. The first input pin set GI1 is electrically connected to the second output pin set GO2 of the first exchanging unit 200. The second input pin set GI2 is electrically connected to the sixth output pin set GO6 of the second exchanging unit 202. The third input pin set GI3 is electrically connected to the third output pin set GO3 of the first exchanging unit 200. The fourth input pin set GI4 is electrically connected to the seventh output pin set GO7 of the second exchanging unit 202. The second multiplexing unit 206 is electrically connected to the first output pin set GO1 of the first exchanging unit 200 and the fifth output pin set GO5 of the second exchanging unit 202, and deliver signals on the first output pin set GO1 of the first exchanging unit 200 and signals on the fifth output pin set GO5 of the second exchanging unit 202 to a second connecting port Pt2 of the first interface 104. In other words, the second connecting port Pt2 of the first interface 104 is coupled to the first output pin set GO1 of the first exchanging unit 200 and the fifth output pin set GO5 of the second exchanging unit 202 via the second multiplexing unit 206.

The transmitting signal sets and the receiving signal sets stated in the above comprise a least a transmitting signal and at least a receiving signal, respectively. A number of transmitting/receiving signals included within each transmitting/receiving signal set may be adjusted according to system requirements. Similarly, the output pin sets and the input pin sets stated in the above comprise a least a pin. A number of pins included within each output/input pin set may be adjusted according to system requirements. For example, the number of pins included within each output/input pin set may depend on how many signals are to be delivered, whether the delivered signals are single end signals or differential end signals, etc.

For convenience of explanation, the first transmitting signal sets A_T_1, B_T_1, the second transmitting signal sets A_T_2, B_T_2, the first receiving signal sets A_R_1, B_R_1 and the second receiving signal sets A_R_2, B_R_2 are delivered from the second interface 106 to the first interface 104 hereafter.

Notably, the first exchanging unit 200 and the second exchanging unit 202 are controlled by the first control signal S0 to change an order of the signal sets delivered to the output pins thereof. Specifically, the first exchanging unit 200 changes an order of the first transmitting signal set A_T_1, the second transmitting signal set A_T_2, the first transmitting signal set B_T_1 and the second transmitting signal set B_T_2 delivered to the first output pin set GO1, the second output pin set GO2, the third output pin set GO3 and the fourth output pin set GO4, according to the first control signal S0. The second exchanging unit 202 changes an order of the first receiving signal set A_R_1, the second receiving signal set A_R_2, the first receiving signal set B_R_1 and the second receiving signal set B_R_2 delivered to the fifth output pin set GO5, the sixth output pin set GO6, the seventh output pin set GO7 and the eighth output pin set GO8, according to the first control signal S0. More specifically, when the first control signal S0 is 0 (corresponding to a first voltage), the first exchanging unit 200 delivers the first transmitting signal set A_T_1 and the second transmitting signal set A_T_2 of the first motherboard 108 to the first output pin set GO1 and the second output pin set GO2, and delivers the first transmitting signal set B_T_1 and the second transmitting signal set B_T_2 of the second motherboard 110 to the third output pin set GO3 and the fourth output pin set GO4; the second exchanging unit 202 delivers the first receiving signal set A_R_1 and the second receiving signal set A_R_2 of the first motherboard 108 to the fifth output pin set GO5 and the sixth output pin set GO6, and delivers the first receiving signal set B_R_1 and the second receiving signal set B_R_2 of the second motherboard 110 to the seventh output pin set GO7 and the eighth output pin set GO8. On the other hand, when the first control signal S0 is 1 (corresponding to a second voltage), the first exchanging unit 200 delivers the first transmitting signal set B_T_1 and the second transmitting signal set B_T_2 of the second motherboard 110 to the first output pin set GO1 and the second output pin set GO2, and delivers the first transmitting signal set A_T_1 and the second transmitting signal set A_T_2 of the first motherboard 108 to the third output pin set GO3 and the fourth output pin set GO4; the second exchanging unit 202 delivers the first receiving signal set B_R_1 and the second receiving signal set B_R_2 of the second motherboard 110 to the fifth output pin set GO5 and the sixth output pin set GO6, and delivers the first receiving signal set A_R_1 and the second receiving signal set A_R_2 of the first motherboard 108 to the seventh output pin set GO7 and the eighth output pin set GO8.

In addition, the first multiplexing unit 204, controlled by the second control signal S1, selects a specific part of input pins from all input pins of the first multiplexing unit 204 and delivers signals on the specific part of input pins to the first connecting port Pt1 of the first interface 104. Specifically, when the second control signal S1 is 0 (corresponding to the first voltage), the first multiplexing unit 204 selectively delivers signals on the first input pin set GI1 and the second input pin set GI2 to the first connecting port Pt1 of the first interface 104. On the other hand, when the second control signal S1 is 1 (corresponding to the second voltage), the first multiplexing unit 204 selectively delivers signals on the third input pin set GI3 and the fourth input pin set GI4 to the first connecting port Pt1 of the first interface 104.

Figure 3A:
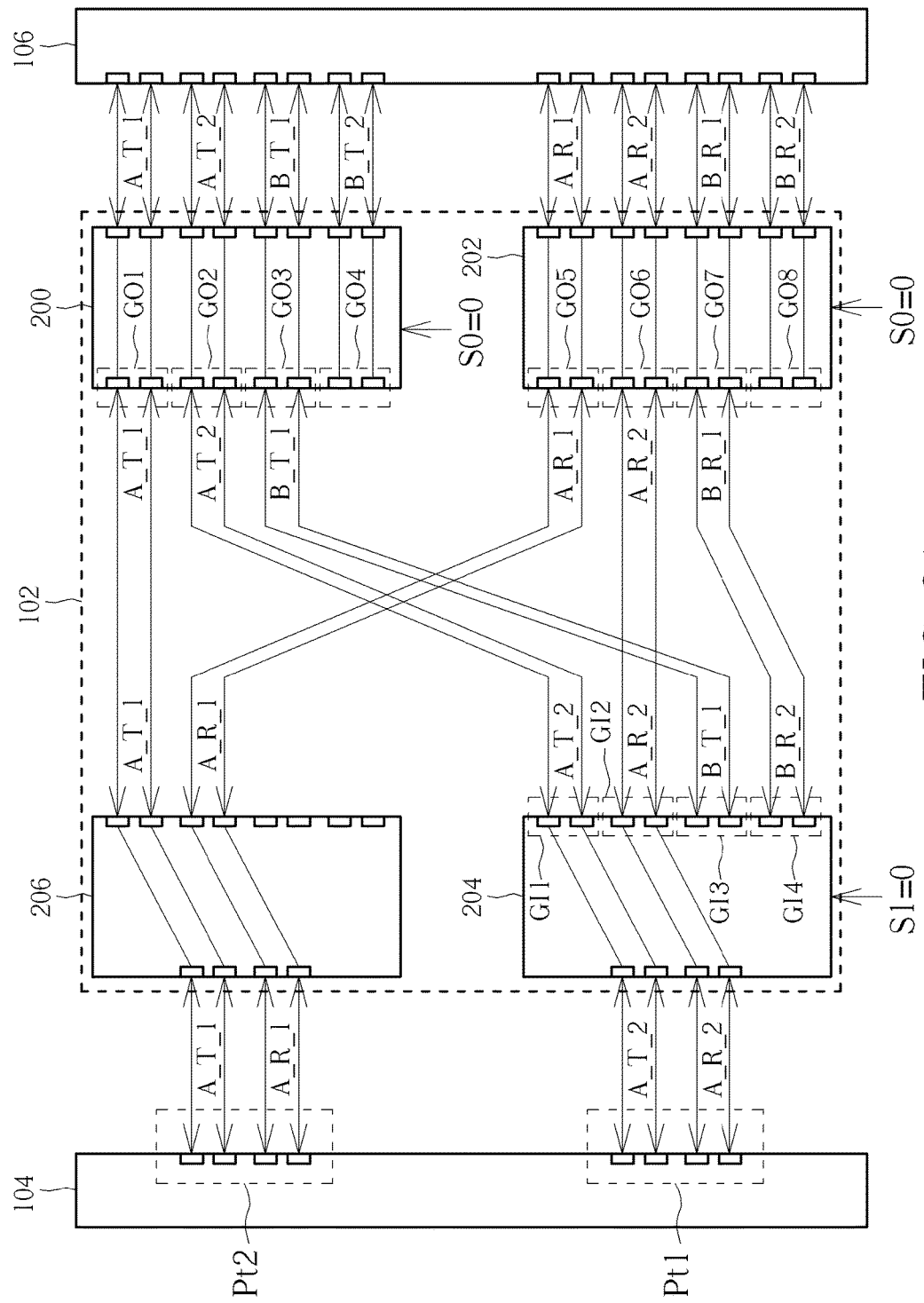
FIG. 3A is a schematic diagram of an operational mode of the connecting circuitry in FIG. 2.

For example, FIG. 3A is a schematic diagram of the connecting circuitry 102 operating in the first mode. When the first control signal S0 is 0 and the second control signal S1 is 0, the connecting circuitry 102 operates in the first mode. Notably, when the first control signal S0 is 0, the first exchanging unit 200 delivers the second transmitting signal set A_T_2 and the first transmitting signal set A_T_1 to the first input pin set GI1 of the first multiplexing unit 204 and the second multiplexing unit 206, respectively, and the second exchanging unit 202 delivers the second receiving signal set A_R_2 and the first receiving signal set A_R_1 to the second input pin set GI2 of the first multiplexing unit 204 and the second multiplexing unit 206, respectively. In such a situation, when the second control signal S1 is 0, as FIG. 3A shows, signals delivered to the first connecting port Pt1 of the first interface 104 are the second transmitting signal set A_T_2 and the second receiving signal set A_R_2, and signals delivered to the second connecting port Pt2 of the first interface 104 are the first transmitting signal set A_T_1 and the first receiving signal set A_R_1. That is, the signals delivered to the first interface 104 are all related to the first motherboard 108, meaning that the first motherboard 108 accesses the storage device 100 by its 4 transmission channels and the storage device 100 is accessed by the first motherboard 108 only.

Figure 3B:
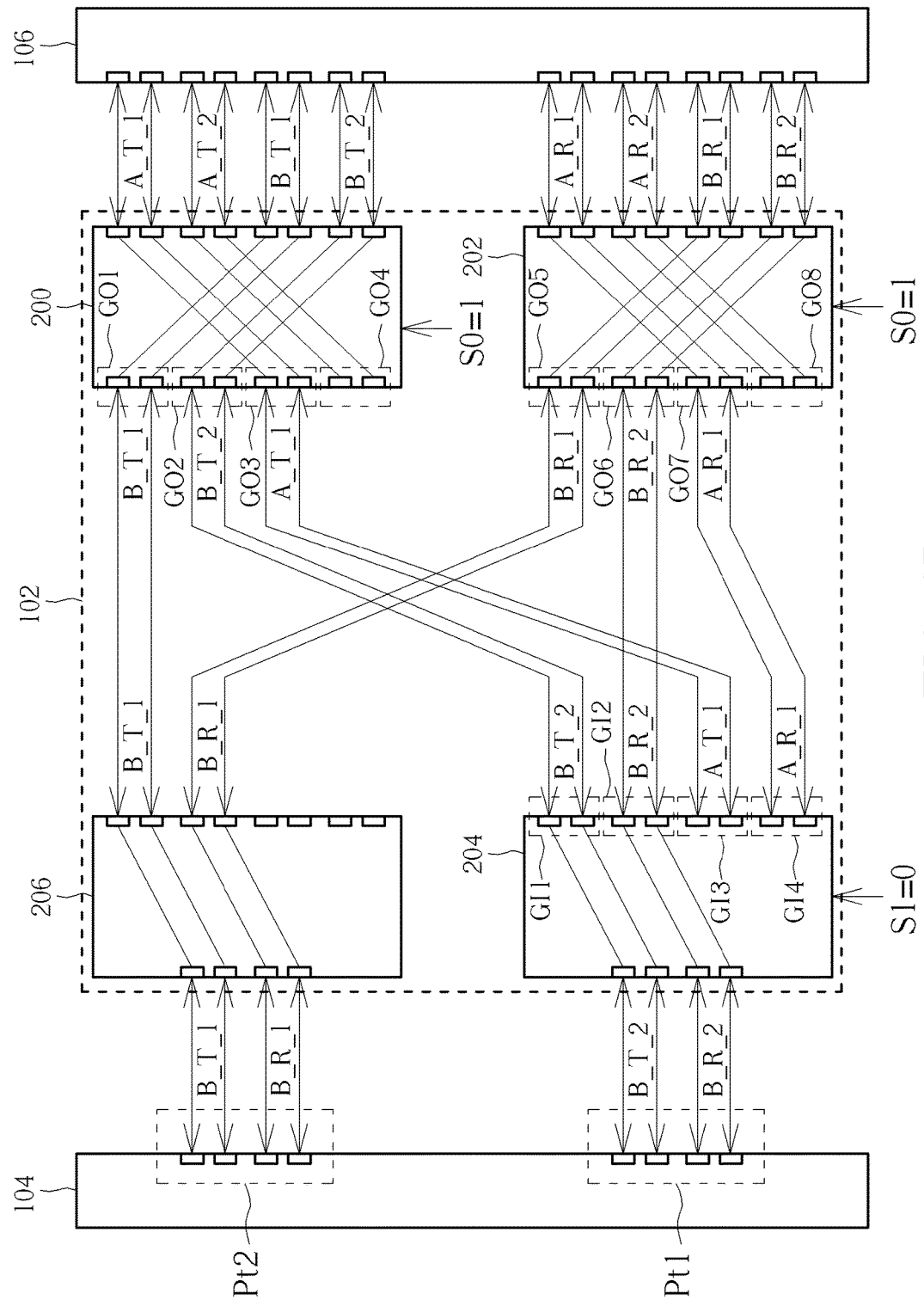
FIG. 3B is a schematic diagram of an operational mode of the connecting circuitry in FIG. 2.

In addition, FIG. 3B is a schematic diagram of the connecting circuitry 102 operating in the second mode. When the first control signal S0 is 1 and the second control signal S1 is 0, the connecting circuitry 102 operates in the second mode.

Notably, when the first control signal S0 is 1, the first exchanging unit 200 delivers the second transmitting signal set B_T_2 and the first transmitting signal set B_T_1 to the first input pin set GI1 of the first multiplexing unit 204 and the second multiplexing unit 206, respectively, and the second exchanging unit 202 delivers the second receiving signal set B_R_2 and the first receiving signal set B_R_1 to the second input pin set GI2 of the first multiplexing unit 204 and the second multiplexing unit 206, respectively. In such a situation, when the second control signal S1 is 0, as FIG. 3B shows, signals delivered to the first connecting port Pt1 of the first interface 104 are the second transmitting signal set B_T_2 and the second receiving signal set B_R_2, and signals delivered to the second connecting port Pt2 of the first interface 104 are the first transmitting signal set B_T_1 and the first receiving signal set B_R_1. That is, the signals delivered to the first interface 104 are all related to the second motherboard 110, meaning that the second motherboard 110 accesses the storage device 100 by its 4 transmission channels and the storage device 100 is accessed by the second motherboard 110 only.

Figure 3C:
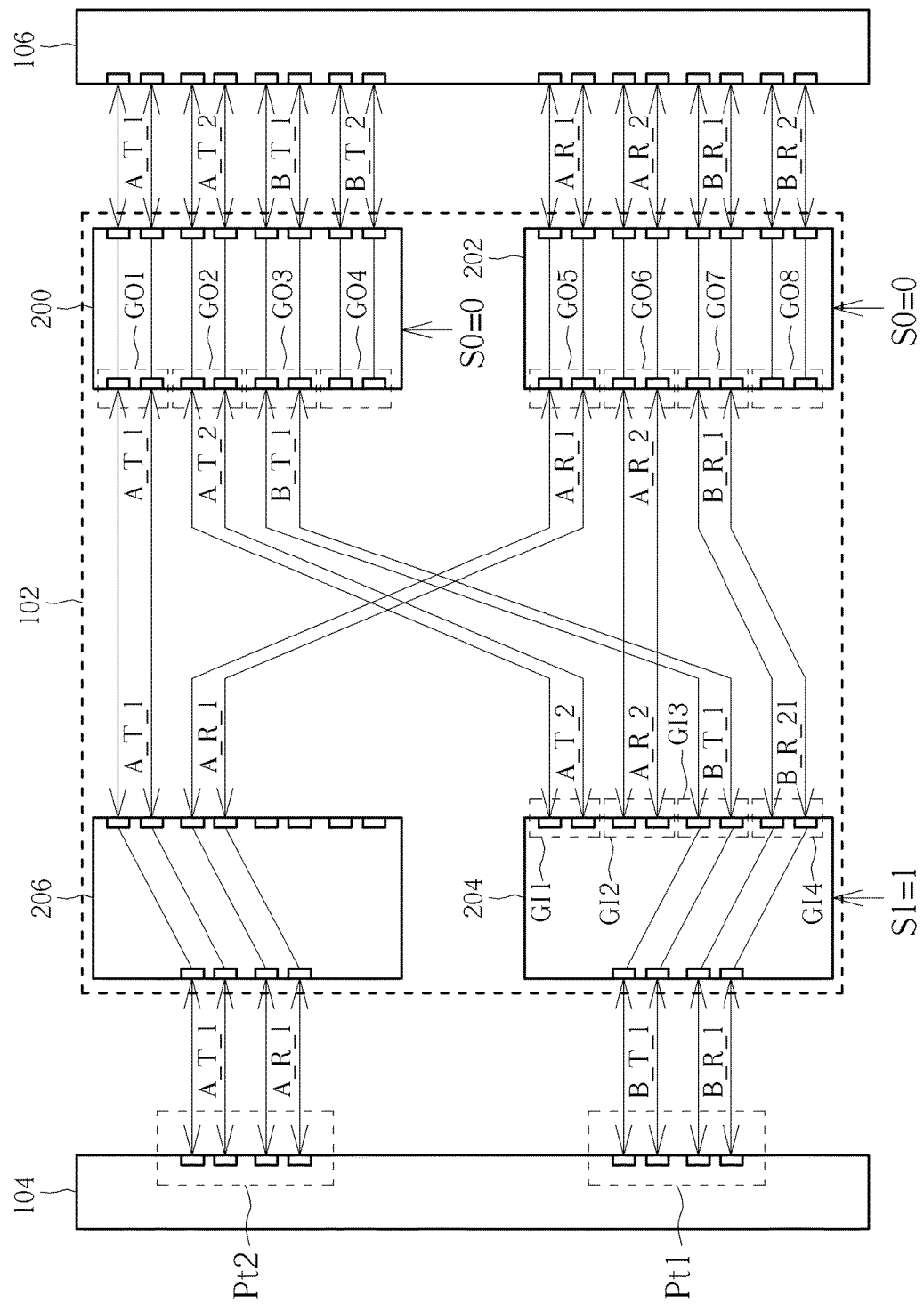
FIG. 3C is a schematic diagram of an operational mode of the connecting circuitry in FIG. 2.
Figure 3D:
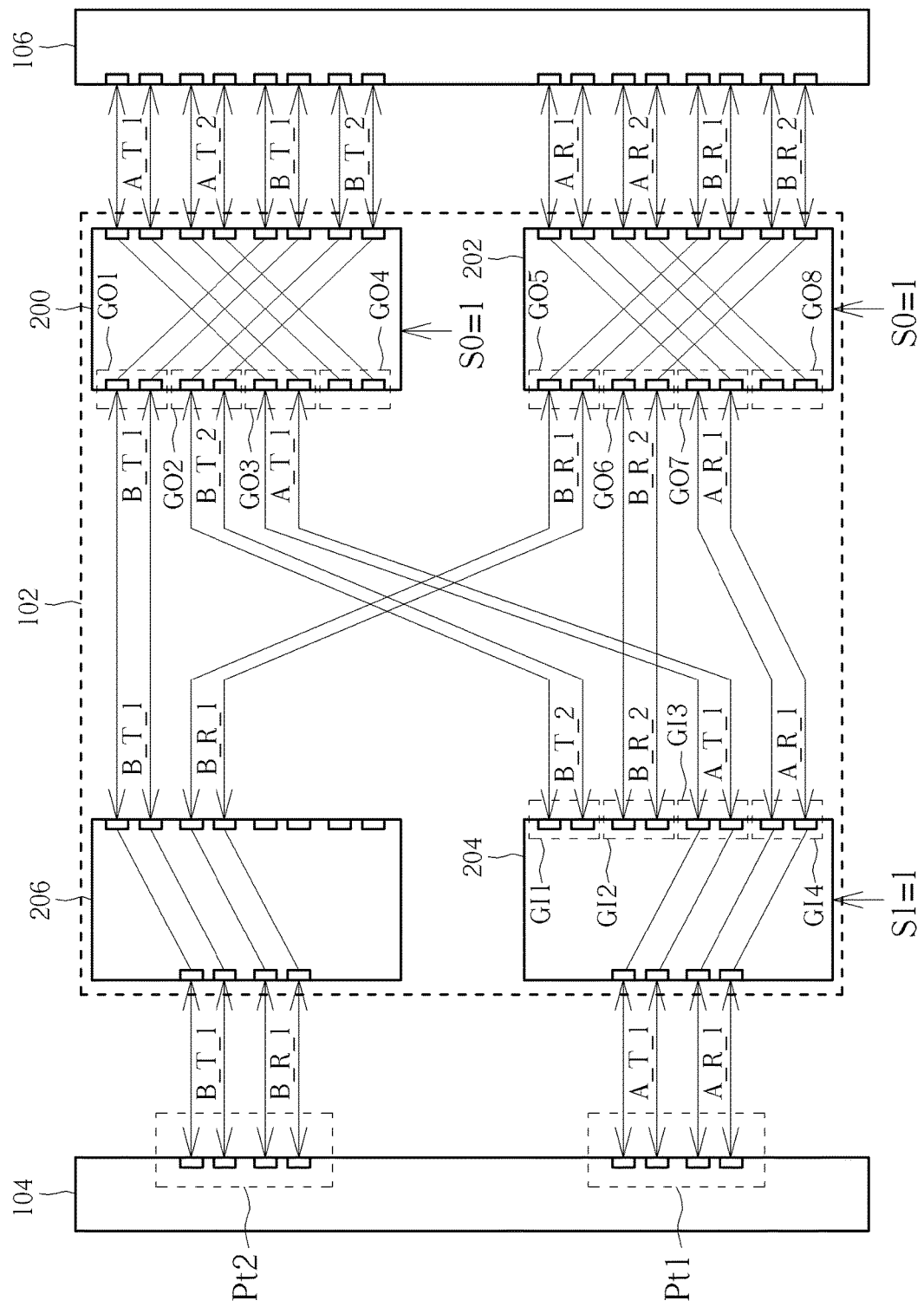
FIG. 3D is a schematic diagram of an operational mode of the connecting circuitry in FIG. 2.

Furthermore, FIG. 3C and FIG. 3D are schematic diagrams of the connecting circuitry 102 operating in the third mode. When the second control signal S1 is 1, the connecting circuitry 102 operates in the third mode. FIG. 3C illustrates an embodiment of the connecting circuitry 102 operating in the third mode, in which the second control signal S1 is 1 and the first control signal S0 is 0. Different from the first mode in FIG. 3A, in the third mode, the second control signal S1 is 1. Thus, the first multiplexing unit 204 delivers the first transmitting signal set B_T_1 on the third input pin set GI3 and the first receiving signal set B_R_1 on the fourth input pin set GI4 to the first connecting port Pt1 of the first interface 104. It means that signals delivered to the first connecting port Pt1 of the first interface 104 are the first transmitting signal set B_T_1 and the first receiving signal set B_R_1 of the second motherboard 110, and signals delivered to the second connecting port Pt2 of the first interface 104 are the first transmitting signal set A_T_1 and the first receiving signal set A_R_1 of the first motherboard 108. Therefore, in this case, the storage device 100 is accessed by both the first motherboard 108 and the second motherboard 110 simultaneously. Similarly, FIG. 3D illustrates another embodiment of the connecting circuitry 102 operating in the third mode, in which the second control signal S1 is 1 and the first control signal S0 is 1. Different from the second mode in FIG. 3B, in the third mode, the second control signal S1 is 1. Thus, the first multiplexing unit 204 delivers the first transmitting signal set A_T_1 on the third input pin set GI3 and the first receiving signal set A_R_1 on the fourth input pin set GI4 to the first connecting port Pt1 of the first interface 104. It means that signals delivered to the first connecting port Pt1 of the first interface 104 are the first transmitting signal set A_T_1 and the first receiving signal set A_R_1 of the first motherboard 108, and signals delivered to the second connecting port Pt2 of the first interface 104 are the first transmitting signal set B_T_1 and the first receiving signal set B_R_1 of the second motherboard 110. Therefore, in this case, the storage device 100 is also accessed by both the first motherboard 108 and the second motherboard 110 simultaneously. To sum up, when the connecting circuitry 102 operates in the third mode (i.e., the second control signal S1 is 1), the storage device 100 is accessed by both the first motherboard 108 and the second motherboard 110 simultaneously.

In the prior art, when the storage device is coupled to two motherboards, the data transmission channels utilized by each motherboard is a half of all the data transmission channels which the storage device affords, and there is no switching mechanism to switch between "the storage device being accessed by the single motherboard only" and "the storage device being accessed by both motherboards simultaneously." In comparison, according to the embodiments as the connecting circuitry 102 of the present invention, when the storage device 100 is accessed by the single motherboard, all the data transmission channels of the storage device are provided to the single motherboard, which maintains the same data transmission capacity as the storage device having a single-port. In addition, according to the connecting circuitry 102, the computing system 10 is able to switch between "the storage device being accessed by the single motherboard only" and "the storage device being accessed by both motherboards simultaneously."

Figure 4:
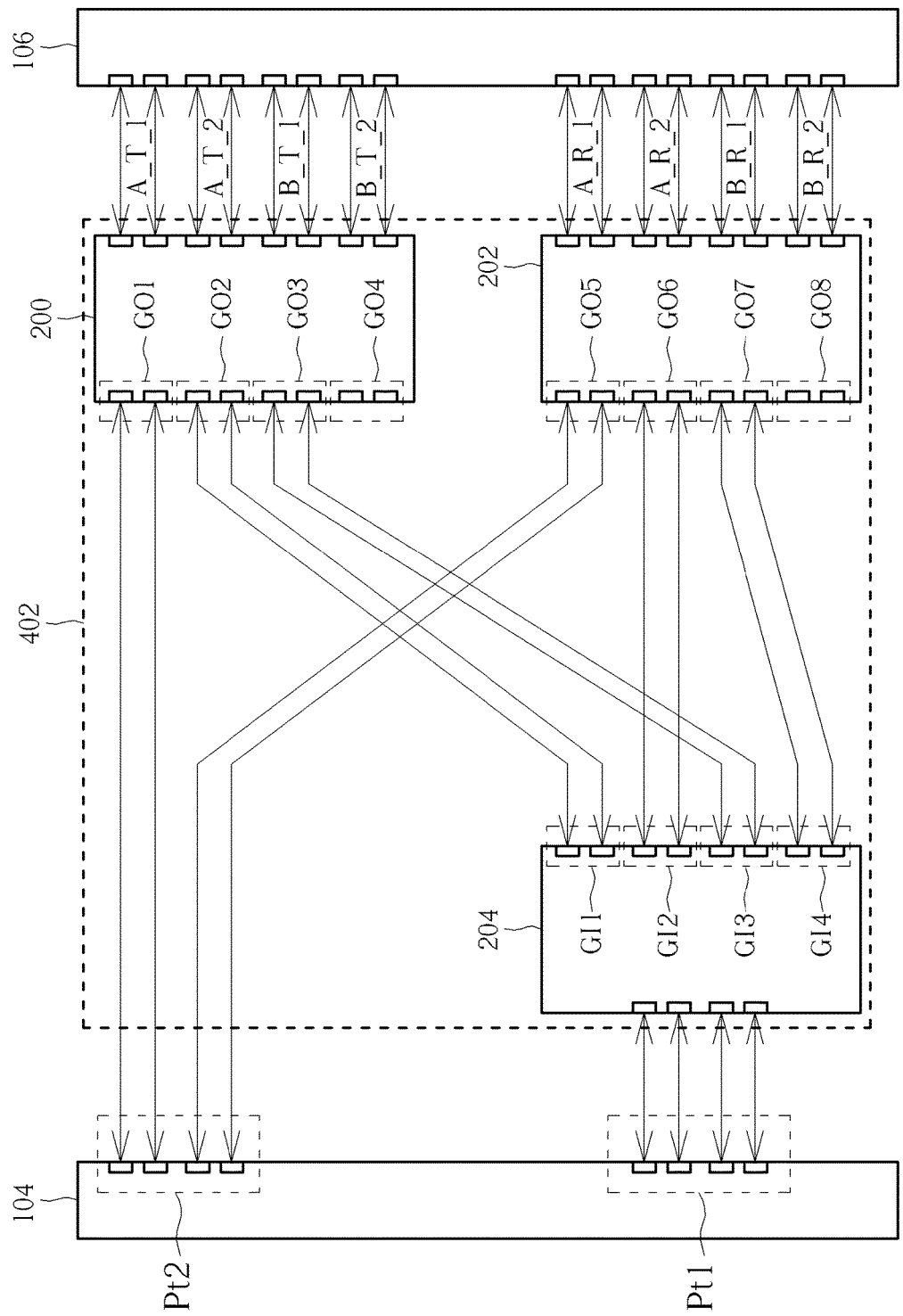
FIG. 4 is a schematic diagram of a connecting circuitry according to an embodiment of the present invention.

Notably, the embodiments stated in the above are utilized for illustrating the concept of the present invention. Those skilled in the art may make modifications and alternations accordingly, and not limited herein. For example, in the embodiments stated in the above, the first transmitting signal sets A_T_1, B_T_1, the second transmitting signal sets A_T_2, B_T_2, the first receiving signal sets A_R_1, B_R_1 and the second receiving signal sets A_R_2, B_R_2 are delivered from the second interface 106 to the first interface 104, which is not limited herein. The signals may be delivered from the first interface 104 to the second interface 106 as well. In addition, the second multiplexing unit 206 may be controlled by a fixed control signal, and not limited thereto. As long as the second connecting port Pt2 of the first interface 104 is coupled to the first output pin set GO1 of the first exchanging unit 200 and the fifth output pin set GO5 of the second exchanging unit 202, requirements of the present invention are satisfied. For example, FIG. 4 is a schematic diagram of a connecting circuitry 402 according to an embodiment of the present invention. The connecting circuitry 402 is similar to the connecting circuitry 102, and thus, same components are denoted by the same denotations. Different from the connecting circuitry 102, in the connecting circuitry 402, the second connecting port Pt2 of the first interface 104 is directly and electrically connected to the first output pin set GO1 of the first exchanging unit 200 and the fifth output pin set GO5 of the second exchanging unit 202, which satisfies the requirement of the present invention and is within the scope of the present invention. In addition, a way of disposing the connecting circuitry is not limited. For example, the connecting circuitry of the present invention may be disposed within an interposer board, and not limited thereto.

In summary, the connecting circuitry is controlled to switched over different modes, such that the storage device is able to be accessed by one single motherboard or two motherboards.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A connecting circuitry, coupled between a first interface and a second interface, the first interface couple to a storage device, the second interface coupled to a first motherboard and a second motherboard, the connecting circuitry comprising:

a first exchanging unit, configured to receive and output a plurality of transmitting signal sets of the first motherboard and the second motherboard and determine an order of the plurality of transmitting signal sets delivered to a plurality of output pins of the first exchanging unit according to a first control signal;

a second exchanging unit, configured to receive and output a plurality of receiving signal sets of the first motherboard and the second motherboard and determine an order of the plurality of receiving signal sets delivered to a plurality of output pins of the second exchanging unit according to the first control signal; and a first multiplexing unit, coupled to the first exchanging unit and the second exchanging unit, configured to receive a transmitting signal set and a receiving signal set of the first motherboard and a transmitting signal set and a receiving signal set of the second motherboard, and determine to output either the transmitting signal set and the receiving signal set of the first motherboard or the transmitting signal set and the receiving signal set of the second motherboard according to a second control signal;

wherein the connecting circuitry is controlled to switch to a first mode, to a second mode, and to a third mode according to the first control signal and the second control signal, the first mode represents that the storage device is accessed by the first motherboard, the second mode represents that the storage device is accessed by the second motherboard, and the third mode represents that the storage device is accessed by both the first motherboard and the second motherboard, wherein the first exchanging unit comprises a first output pin set, a second output pin set, a third output pin set and a fourth output pin set, the first exchanging unit receives a first transmitting signal set and a second transmitting signal set of the first motherboard and a first transmitting signal set and a second transmitting signal set of the second motherboard via the second interface; the second exchanging unit comprises a fifth output pin set, a sixth output pin set, a seventh output pin set and an eighth output pin set, the second exchanging unit receives a first receiving signal set and a second receiving signal set of the first motherboard and a first receiving signal set and a second receiving signal set of the second motherboard via the second interface; the first multiplexing unit is coupled to a first connecting port of the first interface, the first multiplexing unit comprises a first input pin set, a second input pin set, a third input pin set and a fourth input pin set, the first input pin set is electrically connected to the second output pin set of the first exchanging unit, the second input pin set is electrically connected to the sixth output pin set of the second exchanging unit, the third input pin set is electrically connected to the third output pin set of the first exchanging unit, the fourth input pin set is electrically connected to the seventh output pin set of the second exchanging unit, a second connecting port is coupled to the first output pin set of the first exchanging unit and the fifth output pin set of the second exchanging unit.

2. The connecting circuitry of claim 1, wherein when the second control signal is a first voltage, the connecting circuitry operates in the first mode or the second mode.

3. The connecting circuitry of claim 2, wherein the second control signal is the first voltage, the first multiplexing unit delivers signals on the first input pin set and signals on the second input pin set of the first multiplexing unit to the first connecting port of the first interface.

4. The connecting circuitry of claim 2, wherein when the second control signal is the first voltage and the first control signal is the first voltage, the connecting circuitry operates in the first mode.

5. The connecting circuitry of claim 4, wherein when the first control signal is the first voltage, the first output pin set and the second output pin set of the first exchanging unit deliver the first transmitting signal set and the second transmitting signal set of the first motherboard, the third output pin set and the fourth output pin set deliver the first transmitting signal set and the second transmitting signal set of the second motherboard; the fifth output pin set and the sixth output pin set of the second exchanging unit deliver the first receiving signal set and the second receiving signal set of the first motherboard, the seventh output pin set and the eighth output pin set of deliver the first receiving signal set and the second receiving signal set of the second motherboard.

6. The connecting circuitry of claim 2, wherein when the second control signal is the first voltage and the first control signal is a second voltage, the connecting circuitry operates in the second mode.

7. The connecting circuitry of claim 6, wherein when the first control signal is the second voltage, the first output pin set and the second output pin set of the first exchanging unit deliver the first transmitting signal set and the second transmitting signal set of the second motherboard, the third output pin set and the fourth output pin set delivers the first transmitting signal set and the second transmitting signal set of the first motherboard; the fifth output pin set and the sixth output pin set of the second exchanging unit deliver the first receiving signal set the second receiving signal set of the second motherboard, the seventh output pin set and the eighth output pin set deliver the first receiving signal set and the second receiving signal set of the first motherboard.

8. The connecting circuitry of claim 6, wherein when the second control signal is the second voltage, the connecting circuitry operates in the third mode.

9. The connecting circuitry of claim 8, wherein when the second control signal is the second voltage, the first multiplexing unit delivers signals on the third input pin set and signals on the fourth input pin set of the first multiplexing unit to the first connecting port of the first interface.

10. The connecting circuitry of claim 8, wherein when the first control signal is the first voltage, the first output pin set and the second output pin set of the first exchanging unit deliver the first transmitting signal set and the second transmitting signal set of the first motherboard, the third output pin set and the fourth output pin set of the first exchanging unit deliver the first transmitting signal set and the second transmitting signal set of the second motherboard; the fifth output pin set and the sixth output pin set of the second exchanging unit deliver the first receiving signal set and the second receiving signal set of the first motherboard, the seventh output pin set and the eighth output pin set deliver the first receiving signal set and the second receiving signal set of the second motherboard.

11. The connecting circuitry of claim 8, wherein when the first control signal is the second voltage, the first output pin set and the second output pin set of the first exchanging unit deliver the first transmitting signal set and the second transmitting signal set of the second motherboard, the third output pin set and the fourth output pin set deliver the first transmitting signal set and the second transmitting signal set of the first motherboard; the fifth output pin set and the sixth output pin set of the second exchanging unit deliver the first receiving signal set and the second receiving signal set of the second motherboard, the seventh output pin set and the eighth output pin set deliver the first receiving signal set and the second receiving signal set of the first motherboard.

12. The connecting circuitry of claim 1, further comprising:
a second multiplexing unit, coupled between the second connecting port of the first interface, the first exchanging unit and the second exchanging unit, comprising:
a fifth input pin set, electrically connected to the first output pin set of the first exchanging unit; and
a sixth input pin set, electrically connected to the fifth output pin set of the second exchanging unit.

13. The connecting circuitry of claim 1, wherein the storage device is a solid state drive (SSD).

14. The connecting circuitry of claim 1, wherein the first interface meets a standard of SFF-8639.

15. The connecting circuitry of claim 1, wherein the second interface meets a standard of PCI-Express.

16. The connecting circuitry of claim 1, wherein the connecting circuitry is disposed within an interposer board.

17. A computing system, comprising:
a storage device;
a first motherboard;
a second motherboard;
a connecting circuitry, coupled to the storage device via a first interface and coupled to the first motherboard and the second motherboard via a second interface, the connecting circuitry comprising:
a first exchanging unit, configured to receive and output a plurality of transmitting signal sets of the first motherboard and the second motherboard and determine an order of the plurality of transmitting signal sets delivered to a plurality of output pins of the first exchanging unit according to a first control signal;
a second exchanging unit, configured to receive and output a plurality of receiving signal sets of the first motherboard and the second motherboard and determine an order of the plurality of receiving signal sets delivered to a plurality of output pins of the second exchanging unit according to the first control signal; and
a first multiplexing unit, coupled to the first exchanging unit and the second exchanging unit, configured to receive a transmitting signal set and a receiving signal set of the first motherboard and a transmitting signal set and a receiving signal set of the second motherboard, and determine to output either the transmitting signal set and the receiving signal set of the first motherboard or the transmitting signal set and the receiving signal set of the second motherboard according to a second control signal;
wherein the connecting circuitry is controlled to switch over a first mode, a second mode, and a third mode according to the first control signal and the second control signal, the first mode represents that the storage device is accessed by the first motherboard, the second mode represents that the storage device is accessed by the second motherboard, and the third mode represents that the storage device is accessed by both the first motherboard and the second motherboard;
wherein the first exchanging unit comprises a first output pin set, a second output pin set, a third output pin set and a fourth output pin set, the first exchanging unit receives a first transmitting signal set and a second transmitting signal set of the first motherboard and a first transmitting signal set and a second transmitting signal set of the second motherboard via the second interface; the second exchanging unit comprises a fifth output pin set, a sixth output pin set, a seventh output pin set and an eighth output pin set, the second exchanging unit receives a first receiving signal set and a second receiving signal set of the first motherboard and a first receiving signal set and a second receiving signal set of the second motherboard via the second interface; the first multiplexing unit is coupled to a first connecting port of the first interface, the first multiplexing unit comprises a first input pin set, a second input pin set, a third input pin set and a fourth input pin set, the first input pin set is electrically connected to the second output pin set of the first exchanging unit, the second input pin set is electrically connected to the sixth output pin set of the second exchanging unit, the third input pin set is electrically connected to the third output pin set of the first exchanging unit, the fourth input pin set is electrically connected to the seventh output pin set of the second exchanging unit, a second connecting port is coupled to the first output pin set of the first exchanging unit and the fifth output pin set of the second exchanging unit.

18. The computing system of claim 17, wherein when the second control signal is a first voltage, the connecting circuitry operates in the first mode or the second mode.

19. The computing system of claim 18, wherein when the second control signal is the first voltage, the first multiplexing unit delivers signals on the first input pin set and signals on the second input pin set of the first multiplexing unit to the first connecting port of the first interface.

20. The computing system of claim 18, wherein when the second control signal is the first voltage and the first control signal is the first voltage, the connecting circuitry operates in the first mode.

21. The computing system of claim 20, wherein when the first control signal is the first voltage, the first output pin set and the second output pin set of the first exchanging unit deliver the first transmitting signal set and the second transmitting signal set of the first motherboard, the third output pin set and the fourth output pin set deliver the first transmitting signal set and the second transmitting signal set of the second motherboard; the fifth output pin set and the sixth output pin set of the second exchanging unit deliver the first receiving signal set and the second receiving signal set of the first motherboard, the seventh output pin set and the eighth output pin set of deliver the first receiving signal set and the second receiving signal set of the second motherboard.

22. The computing system of claim 18, wherein when the second control signal is the first voltage and the first control signal is a second voltage, the connecting circuitry operates in the second mode.

23. The computing system of claim 22, wherein when the first control signal is the second voltage, the first output pin set and the second output pin set of the first exchanging unit deliver the first transmitting signal set and the second transmitting signal set of the second motherboard, the third output pin set and the fourth output pin set delivers the first transmitting signal set and the second transmitting signal set of the first motherboard; the fifth output pin set and the sixth output pin set of the second exchanging unit deliver the first receiving signal set the second receiving signal set of the second motherboard, the seventh output pin set and the eighth output pin set deliver the first receiving signal set and the second receiving signal set of the first motherboard.

24. The computing system of claim 22, wherein when the second control signal is the second voltage, the connecting circuitry operates in the third mode.

25. The computing system of claim 24, wherein when the second control signal is the second voltage, the first multiplexing unit delivers signals on the third input pin set and signals on the fourth input pin set of the first multiplexing unit to the first connecting port of the first interface.

26. The computing system of claim 24, wherein when the first control signal is the first voltage, the first output pin set and the second output pin set of the first exchanging unit deliver the first transmitting signal set and the second transmitting signal set of the first motherboard, the third output pin set and the fourth output pin set of the first exchanging unit deliver the first transmitting signal set and the second transmitting signal set of the second motherboard; the fifth output pin set and the sixth output pin set of the second exchanging unit deliver the first receiving signal set and the second receiving signal set of the first motherboard, the seventh output pin set and the eighth output pin set deliver the first receiving signal set and the second receiving signal set of the second motherboard.

27. The computing system of claim 24, wherein when the first control signal is the second voltage, the first output pin set and the second output pin set of the first exchanging unit deliver the first transmitting signal set and the second transmitting signal set of the second motherboard, the third output pin set and the fourth output pin set deliver the first transmitting signal set and the second transmitting signal set of the first motherboard; the fifth output pin set and the sixth output pin set of the second exchanging unit deliver the first receiving signal set and the second receiving signal set of the second motherboard, the seventh output pin set and the eighth output pin set deliver the first receiving signal set and the second receiving signal set of the first motherboard.

28. The computing system of claim 17, further comprising:
 a second multiplexing unit, coupled between the second connecting port of the first interface, the first exchanging unit and the second exchanging unit, comprising:
  a fifth input pin set, electrically connected to the first output pin set of the first exchanging unit; and
  a sixth input pin set, electrically connected to the fifth output pin set of the second exchanging unit.

29. The computing system of claim 17, wherein the storage device is a solid state drive (SSD).

30. The computing system of claim 17, wherein the first interface meets a standard of SFF-8639.

31. The computing system of claim 17, wherein the second interface meets a standard of PCI-Express.

32. The computing system of claim 17, wherein the connecting circuitry is disposed within an interposer board.

* * * * *